(12) United States Patent
Reang et al.

(10) Patent No.: US 11,598,068 B2
(45) Date of Patent: Mar. 7, 2023

(54) DRAWBAR ASSEMBLY FOR A MOTOR GRADER

(71) Applicant: Caterpillar Inc., Peoria, IL (US)

(72) Inventors: Davida Ray Reang, Chennai (IN); David Lee Cox, Monticello, IL (US); Benjamin J Kovalick, Decatur, IL (US)

(73) Assignee: Caterpillar Inc., Peoria, IL (US)

( * ) Notice: Subject to any disclaimer, the term of this patent is extended or adjusted under 35 U.S.C. 154(b) by 372 days.

(21) Appl. No.: 16/885,379

(22) Filed: May 28, 2020

(65) Prior Publication Data

US 2021/0372080 A1 Dec. 2, 2021

(51) Int. Cl.
*E01C 19/18* (2006.01)
*E02F 3/80* (2006.01)
*E02F 3/76* (2006.01)
*B23K 101/00* (2006.01)

(52) U.S. Cl.
CPC ............ *E02F 3/80* (2013.01); *E02F 3/764* (2013.01); *B23K 2101/006* (2018.08); *E02F 3/765* (2013.01); *E02F 3/7645* (2013.01); *E02F 3/7654* (2013.01); *E02F 3/7659* (2013.01)

(58) Field of Classification Search
CPC ...... E01C 19/187; E02F 3/7636; E02F 3/845; E02F 3/80; E02F 3/764; E02F 3/7645; E02F 3/765; E02F 3/7654; E02F 3/7659; E02F 3/961; E02F 3/7672; E02F 3/815; E02F 3/8152; B23K 2101/006
See application file for complete search history.

(56) References Cited

U.S. PATENT DOCUMENTS

| | | | | |
|---|---|---|---|---|
| 144,202 A | * | 11/1873 | Horney | A01B 23/043 172/244 |
| RE8,388 E | * | 8/1878 | Day | 37/203 |
| 316,779 A | * | 4/1885 | Haslup | E02F 3/6463 37/440 |
| 410,388 A | * | 9/1889 | Walworth | E02F 3/764 172/796 |
| 412,036 A | * | 10/1889 | Moats | E02F 3/764 172/796 |
| 547,840 A | * | 10/1895 | Bunnell | E02F 3/765 172/793 |

(Continued)

*Primary Examiner* — Edwin J Toledo-Duran
(74) *Attorney, Agent, or Firm* — Harrity & Harrity, LLP

(57) ABSTRACT

A drawbar assembly for a motor grader is provided. The drawbar assembly defines a longitudinal axis and includes a first frame member and a second frame member. The first frame member is adapted to be movably coupled to main frame of the motor grader. The first frame member includes a first base member extending along longitudinal axis and a first mating portion bent away relative to first base member to extend transversely relative to longitudinal axis. The second frame member includes a second base member extending along longitudinal axis and a second mating portion bent away relative to second base member to extend transversely relative to longitudinal axis. The second mating portion is configured to mate with first mating portion to form a connection joint therebetween, facilitating the first frame member and second frame member to be conjoined to together support a circle assembly of the motor grader thereunder.

20 Claims, 6 Drawing Sheets

(56) References Cited

U.S. PATENT DOCUMENTS

| | | | | |
|---|---|---|---|---|
| 723,619 A * | 3/1903 | Olcott | A01B 49/02 | |
| | | | 172/477 | |
| 724,042 A * | 3/1903 | Rhodes et al. | E02F 3/765 | |
| | | | 172/507 | |
| 899,798 A * | 9/1908 | Ott | A01B 19/02 | |
| | | | 172/660 | |
| 1,464,672 A * | 8/1923 | Whittemore | E02F 3/7686 | |
| | | | 172/647 | |
| 1,558,655 A * | 10/1925 | Walker | E01C 23/082 | |
| | | | 172/685 | |
| 1,576,808 A * | 3/1926 | Bunnell | E02F 3/76 | |
| | | | 172/684.5 | |
| 1,586,824 A * | 6/1926 | Mentzer | B62D 13/00 | |
| | | | 280/466 | |
| 1,718,965 A * | 7/1929 | Larsh | E02F 3/7636 | |
| | | | 172/792 | |
| 1,769,716 A * | 7/1930 | Schlacks | E02F 3/764 | |
| | | | 172/796 | |
| 1,788,698 A * | 1/1931 | Wooldridge | E02F 3/7613 | |
| | | | 37/235 | |
| 1,807,639 A * | 6/1931 | Stocker | E02F 3/7627 | |
| | | | 172/741 | |
| 1,833,878 A * | 11/1931 | Adams | E01C 23/082 | |
| | | | 172/780 | |
| 1,892,907 A * | 1/1933 | Sjogren | E02F 3/65 | |
| | | | 37/427 | |
| 1,955,925 A * | 4/1934 | Maloon | B62D 49/00 | |
| | | | 172/453 | |
| 1,999,189 A * | 4/1935 | Gustafson | E02F 3/7636 | |
| | | | 172/793 | |
| 2,034,141 A * | 3/1936 | Gustafson | E02F 3/7636 | |
| | | | 74/15.84 | |
| 2,237,586 A * | 4/1941 | Cost | E02F 3/764 | |
| | | | 280/786 | |
| 2,243,251 A * | 5/1941 | Gustafson | E01C 19/266 | |
| | | | 404/128 | |
| 2,266,819 A * | 12/1941 | Seaholm | A01B 21/08 | |
| | | | 172/581 | |
| 2,325,025 A * | 7/1943 | Allen | E02F 3/84 | |
| | | | 172/7 | |
| 2,340,169 A * | 1/1944 | Arndt | E02F 3/844 | |
| | | | 172/791 | |
| 2,579,086 A * | 12/1951 | Oehler | A01B 23/046 | |
| | | | 172/580 | |
| 2,619,749 A * | 12/1952 | Wilson | E02F 3/7672 | |
| | | | 172/779 | |
| 2,629,944 A * | 2/1953 | Arps | E02F 3/8157 | |
| | | | 37/231 | |
| 2,822,628 A * | 2/1958 | Arps | E02F 3/7627 | |
| | | | 172/445.2 | |
| 3,229,391 A * | 1/1966 | Breitbarth | E02F 3/845 | |
| | | | 280/446.1 | |
| 3,474,550 A * | 10/1969 | William | E02F 3/64 | |
| | | | 37/430 | |
| 3,513,790 A * | 5/1970 | Olsson | A01C 5/06 | |
| | | | 111/164 | |
| 3,637,036 A * | 1/1972 | Swisher, Jr. | F16H 61/425 | |
| | | | 60/483 | |
| 3,791,264 A * | 2/1974 | Hanser | E02F 3/764 | |
| | | | 91/271 | |
| 3,896,899 A * | 7/1975 | Scholl | E02F 3/845 | |
| | | | 172/4.5 | |
| 4,053,017 A * | 10/1977 | Gill | E02F 3/845 | |
| | | | 172/430 | |
| 4,060,136 A | 11/1977 | Hendrickson et al. | | |
| 4,064,947 A | 12/1977 | Cole | | |
| 4,431,060 A * | 2/1984 | Scholl | E02F 3/845 | |
| | | | 172/4.5 | |
| 5,217,242 A | 6/1993 | Thomas | | |
| 5,667,020 A * | 9/1997 | Palmer | E02F 3/765 | |
| | | | 74/448 | |
| 6,032,593 A * | 3/2000 | Wendling | A01C 5/064 | |
| | | | 111/924 | |
| 6,230,818 B1 | 5/2001 | Slunder | | |
| 7,841,422 B1 * | 11/2010 | Chavez | A01B 43/00 | |
| | | | 171/111 | |
| 8,746,362 B2 * | 6/2014 | Bindl | E02F 9/202 | |
| | | | 172/795 | |
| 9,661,922 B2 * | 5/2017 | Ehmke | A47B 81/00 | |
| 2003/0090084 A1 * | 5/2003 | Goby | B60D 1/28 | |
| | | | 280/493 | |
| 2004/0161087 A1 * | 8/2004 | Taylor | A01B 71/066 | |
| | | | 379/200 | |
| 2005/0194162 A1 * | 9/2005 | Job | A01B 59/043 | |
| | | | 172/810 | |
| 2006/0055151 A1 * | 3/2006 | Forrister | B60D 1/06 | |
| | | | 280/511 | |
| 2007/0039259 A1 * | 2/2007 | MacDonald | E04B 2/7425 | |
| | | | 52/238.1 | |
| 2007/0181318 A1 * | 8/2007 | Laudick | E02F 3/6481 | |
| | | | 172/810 | |
| 2011/0057999 A1 * | 3/2011 | Gonzales | B41J 2/17513 | |
| | | | 347/86 | |
| 2012/0125647 A1 * | 5/2012 | Smith | B60D 1/465 | |
| | | | 172/1 | |
| 2017/0118920 A1 * | 5/2017 | Stewart | A01G 9/28 | |
| 2018/0080194 A1 * | 3/2018 | Hayes | E01C 19/187 | |
| 2020/0290655 A1 * | 9/2020 | Morin | B61F 5/142 | |

\* cited by examiner

DRAWBAR ASSEMBLY FOR A MOTOR GRADER

TECHNICAL FIELD

The present disclosure generally relates to motor graders. More particularly, the present disclosure relates to a drawbar assembly for motor graders.

BACKGROUND

Motor graders are very commonly known for various earth moving operations, such as road maintenance, surface contouring, ditch work, etc. Generally, motor graders include a main frame having a steerable front frame and a driven rear frame. The front frame supports a drawbar-circle-blade (DCB) arrangement to perform the one or more grading operations. The DCB arrangement includes a drawbar assembly, a circle assembly, and a blade assembly, each of which functions in concert with the other to perform the one or more grading operations. The blade assembly is mounted on to the circle assembly, which in turn is rotatably mounted to the drawbar assembly for rotating the blade assembly relative to the drawbar assembly.

Typically, the drawbar assembly includes a front end connected to the front frame of the motor grader by a ball and socket connection and a rearward portion suspended by one or more fluid actuators to facilitate upward and downward movement of the drawbar assembly. The circle assembly and the blade assembly are further connected to a rear end of the drawbar assembly. Generally, the design of these drawbar assemblies remains same across all models of motor graders, however, they may vary in size, such as lengths, for different models. Thus, manufacturing drawbars for every model is expensive and increases inventory, which is not desirable. Moreover, since the drawbar assembly is exposed to heavy stresses during the various grading operations, even for a small damage or issue, it may be required to change the entire drawbar assembly, which may be expensive and hence not desirable.

U.S. Pat. No. 4,064,947 (hereinafter referred to as the '947 patent) provides that motor graders have a longitudinal main frame which carries a circle mounting bar that pivots on a horizontal axis at a connecting end and that has a carrying portion remote from its connecting end. A circle rotates on a vertical axis on the mounting bar carrying portion, and a grader blade is mounted on the circle. The circle mounting bar of the '947 patent is a box-like beam with internal vertical webs, and the beam increases in width from its connecting end toward a carrying portion of box-like cross section which is a separate part integrally welded to the beam. The shape of the beam in plan is intermediate between an isosceles triangle with its apex at the connecting end and a parabola with its apex at said end so as to give optimum uniformity of stress, throughout the length of the mounting bar, to both vertical and lateral forces.

SUMMARY OF THE INVENTION

In one aspect, a drawbar assembly for a motor grader is provided. The drawbar assembly defines a longitudinal axis and includes a first frame member and a second frame member. The first frame member is adapted to be movably coupled to main frame of the motor grader. The first frame member includes a first base member extending along longitudinal axis and a first mating portion bent away relative to first base member to extend transversely relative to longitudinal axis. The second frame member includes a second base member extending along longitudinal axis and a second mating portion bent away relative to second base member to extend transversely relative to longitudinal axis. The second mating portion is configured to mate with first mating portion to form a connection joint therebetween, facilitating the first frame member and second frame member to be conjoined to together support a circle assembly of the motor grader thereunder.

In another aspect, a method of manufacturing a drawbar assembly for a motor grader, is provided. The method includes providing a first frame member and a second frame member. The first frame member is for being movably coupled to a main frame of the motor grader. The first frame member includes a first base member extending along a first longitudinal axis and a first mating portion bent away relative to the first base member to extend transversely relative to the first longitudinal axis. The second frame member includes a second base member extending along a second longitudinal axis and a second mating portion bent away relative to the second base member to extend transversely relative to the second longitudinal axis. The method further includes aligning the first mating portion of the first frame member and the second mating portion of the second frame member such that the first longitudinal axis aligns with the second longitudinal axis to define a longitudinal axis of the drawbar assembly. Furthermore, the method includes joining the first mating portion to the second mating portion to form a connection joint therebetween, facilitating the first frame member and the second frame member to together support a circle assembly of the motor grader thereunder.

In yet another aspect, a motor grader is provided. The motor grader includes a main frame, a circle assembly and a drawbar assembly. The circle assembly supports an implement of the motor grader. The drawbar assembly is supported and disposed beneath the main frame. The drawbar assembly defines a longitudinal axis and includes a first frame member and a second frame member. The first frame member is movably coupled to the main frame. The first frame member includes a first base member extending along the longitudinal axis and a first mating portion bent away relative to the first base member to extend transversely relative to the longitudinal axis. The second frame member includes a second base member extending along the longitudinal axis and a second mating portion bent away relative to the second base member to extend transversely relative to the longitudinal axis. The second mating portion is joined to the first mating portion to form a connection joint therebetween. The drawbar assembly further includes a mounting member coupled to the circle assembly and being attached underneath the joined first frame member and the second frame member.

DETAILED DESCRIPTION

Figure 1:
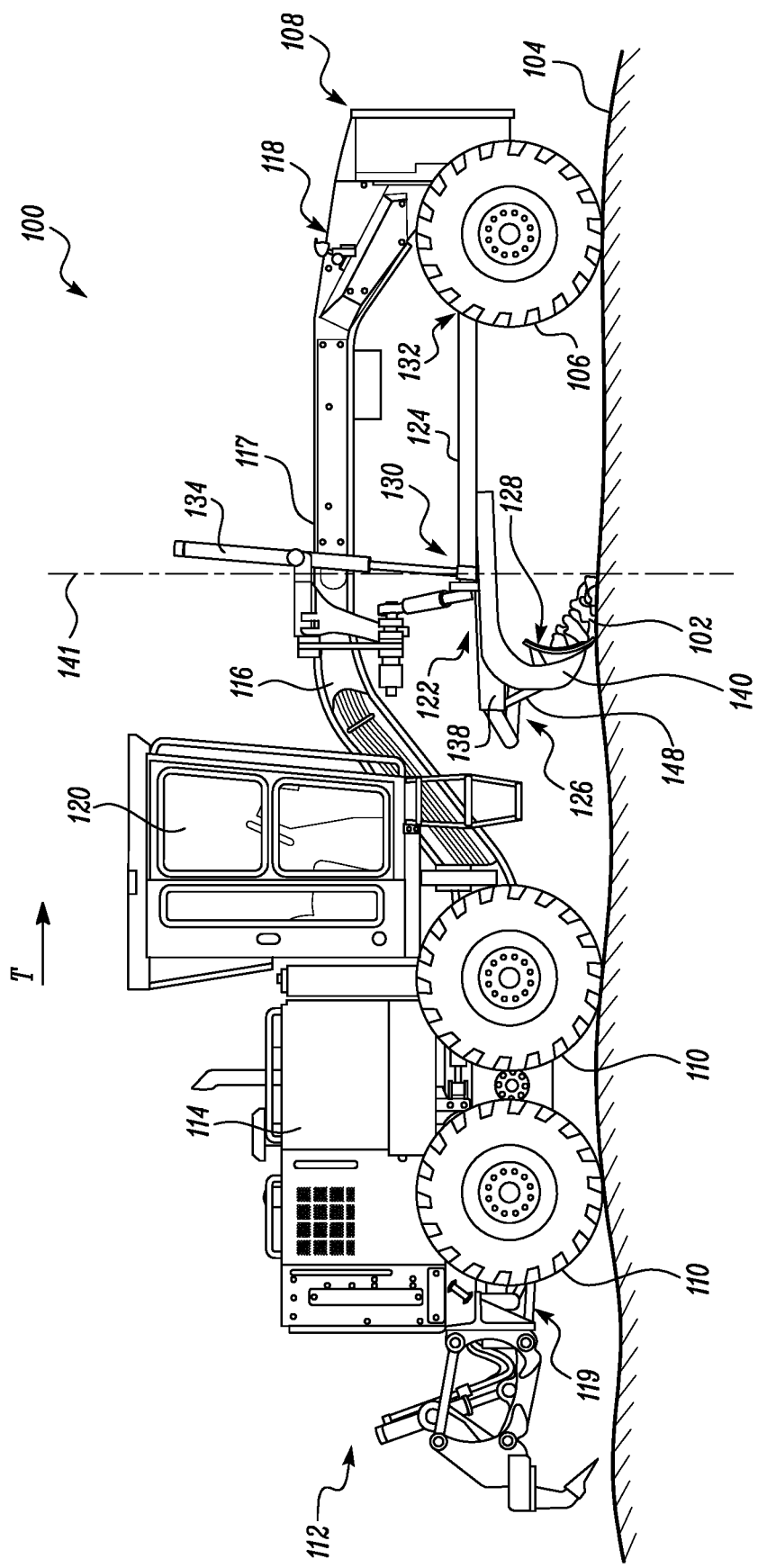
FIG. 1 illustrates an exemplary grader machine, according to the embodiments of the present disclosure.

The present disclosure relates to a drawbar assembly for a grader machine. FIG. 1 illustrates an exemplary grader machine 100 in accordance with the various embodiments of the present disclosure. In an embodiment of the present disclosure, the grader machine 100, hereinafter referred to as the machine 100, is embodied as a motor grader. The machine 100 may be used to displace, spread, distribute, level, and grade materials 102, such as soil, over a work surface 104. Generally, a grading operation is performed during machine movement, and for this purpose, the machine 100 may include traction devices that facilitate movement over the work surface 104. For example, traction devices include a set of front wheels 106 (only one side shown) disposed towards a front end 108 of the machine 100 and a set of rear wheels 110 disposed towards a rear end 112 of the machine 100. The terms 'front' and 'rear', as used herein, are in relation to a direction of travel of the machine 100, as represented by arrow, T, in FIG. 1, with said direction of travel being exemplarily defined from the rear end 112 towards the front end 108. The movement of the traction devices (i.e. rotation of the set of front wheels 106 and set of rear wheels 110) may be powered by a power source, such as an engine (not shown), housed within a power compartment 114 of the machine 100.

Further, the machine 100 includes a main frame 116 including a steerable front section 118 at the front end 108 and a driven rear section 119 at the rear end 112 of the machine 100. An operator cab 120 is supported on the main frame 116 and houses controls of the power source and various implements of the machine 100.

Figure 2:
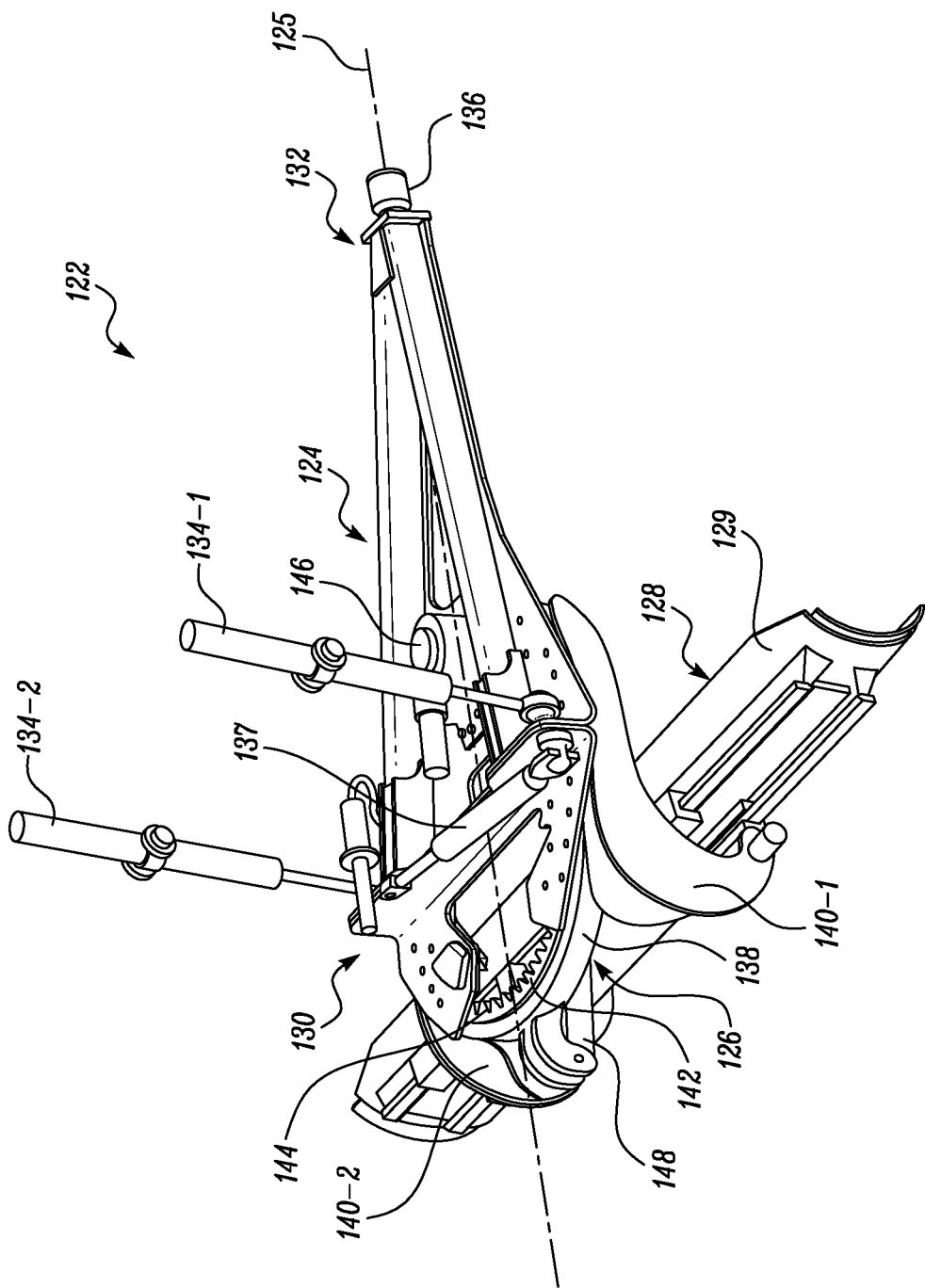
FIG. 2 illustrates an exemplary drawbar-circle-blade (DCB) assembly of the grader machine, according to the embodiments of the present disclosure.

Referring to FIGS. 1 and 2, the machine 100 includes a drawbar-circle-blade (DCB) arrangement 122—also referred to as a grader group 122 for grading and levelling the material 102. As illustrated, the grader group 122 is supported by and underneath the main frame 116 and is connected to the front section 118 of the main frame 116. In some alternative embodiments, that the grader group 122 may be supported by another portion of the machine 100, such as by the rear section 119 or by another portion of the front section 118 of the main frame 116. The grader group 122 may include a drawbar assembly 124, a circle assembly 126, and an implement assembly, such as a blade assembly 128, each of which may function in concert to perform a grading operation on the work surface 104.

The drawbar assembly 124 defines a longitudinal axis 125 and includes a first end 130 and a second end 132 of the drawbar assembly 124 defined along the longitudinal axis 125. The first end 130 of the drawbar assembly 124 rotatably supports the circle assembly 126 and the blade assembly 128 thereto. Further, the first end 130 of the drawbar assembly 124 is movably supported by a mid-section 117 of the main frame 116, for example, via one or more lifting mechanisms, such as hydraulic actuators 134. The hydraulic actuators 134 may be actuated to raise or lower the first end 130 of the drawbar assembly 124 with respect to the main frame 116, in turn allowing the grader group 122 to be raised or lowered relative to the work surface 104.

Further, the drawbar assembly 124 is supported beneath the main frame 116, such that the second end 132 of the drawbar assembly 124 is pivotally connected to the front section 118 of the main frame 116. For example, the second end 132 of the drawbar assembly 124 is connected to the main frame 116 via an articulation ball joint 136 (shown in FIG. 2). The articulation ball joint 136 may be configured to facilitate side-to-side swinging of the grader group 122 about the longitudinal axis 125 of the drawbar assembly 124, which in turn defines a swing axis (not shown) of the articulation ball joint 136. As illustrated in FIG. 2, one or more swing actuators 137 may be configured to be actuated to facilitate the side-to-side swinging of the drawbar assembly 124 about the swing axis of the articulation ball joint 136.

The circle assembly 126 includes a circle member 138 and a pair of arms 140-1, 140-2 (hereinafter collectively referred to as the pair of arms 140). The circle member 138 is configured to rotate relative to the drawbar 124 about a rotation axis 141 that passes through a center of the circle member 138. For example, the circle member 138 includes a ring gear portion 142 having a plurality of teeth 144 (shown in FIG. 2) configured to engage with a drive gear 146 on the drawbar assembly 124 to facilitate the rotation of the circle assembly 126 about the rotation axis 141.

Further, the pair of arms 140 extend from the circle member 138 and are configured to tiltably support the blade assembly 128 thereto. The blade assembly 128 includes a moldboard 129 mounted to the circle assembly 126 for rotation about the rotation axis 141. For example, the circle assembly 126 may include one or more tilt actuators 148 coupled to the moldboard 129 to facilitate tilting of the blade assembly 128 relative to the circle assembly 126.

Figure 3:
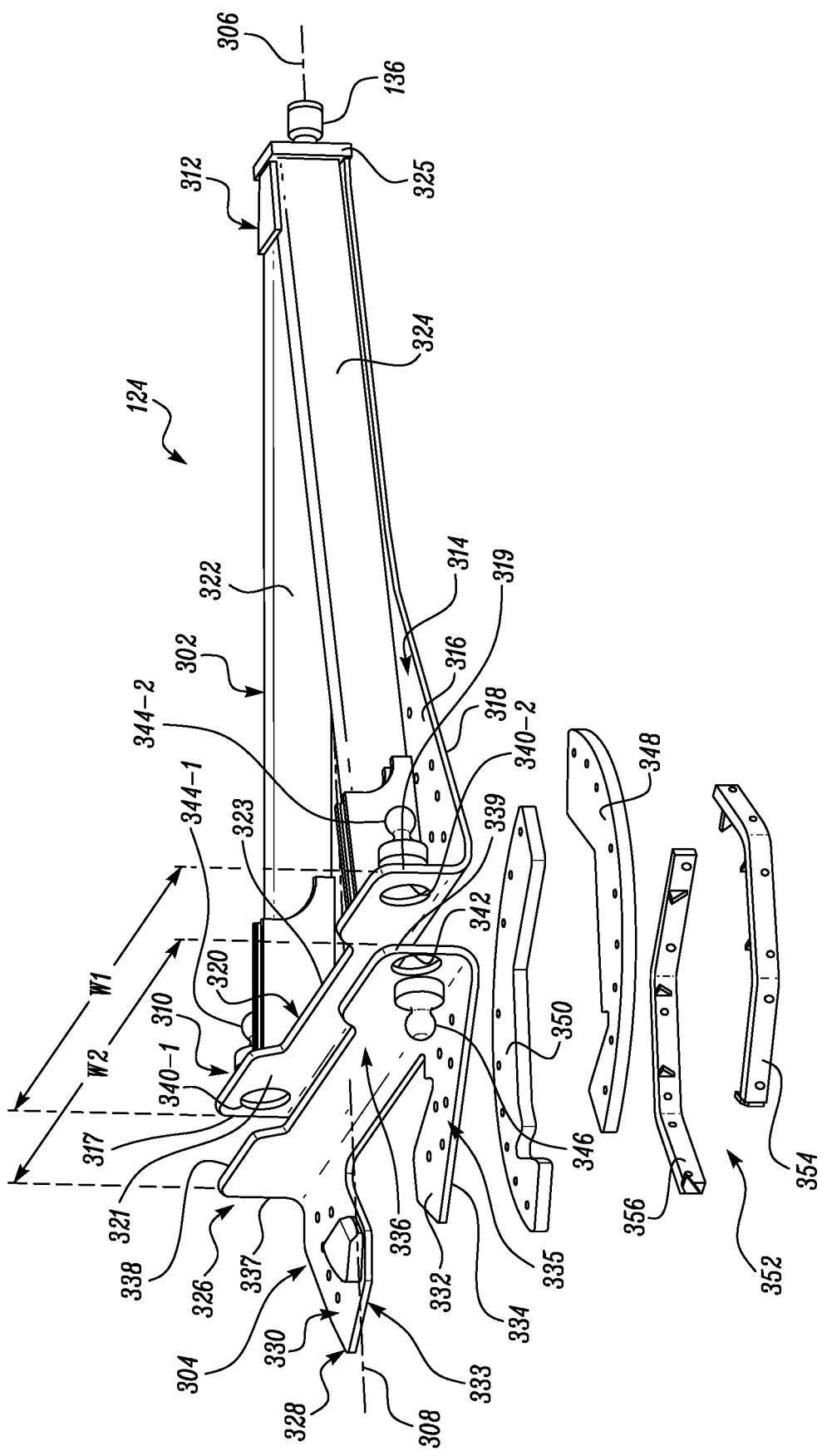
FIG. 3 illustrates an exemplary first frame member and a second frame member of a drawbar assembly, according to the embodiments of the present disclosure.
Figure 4:
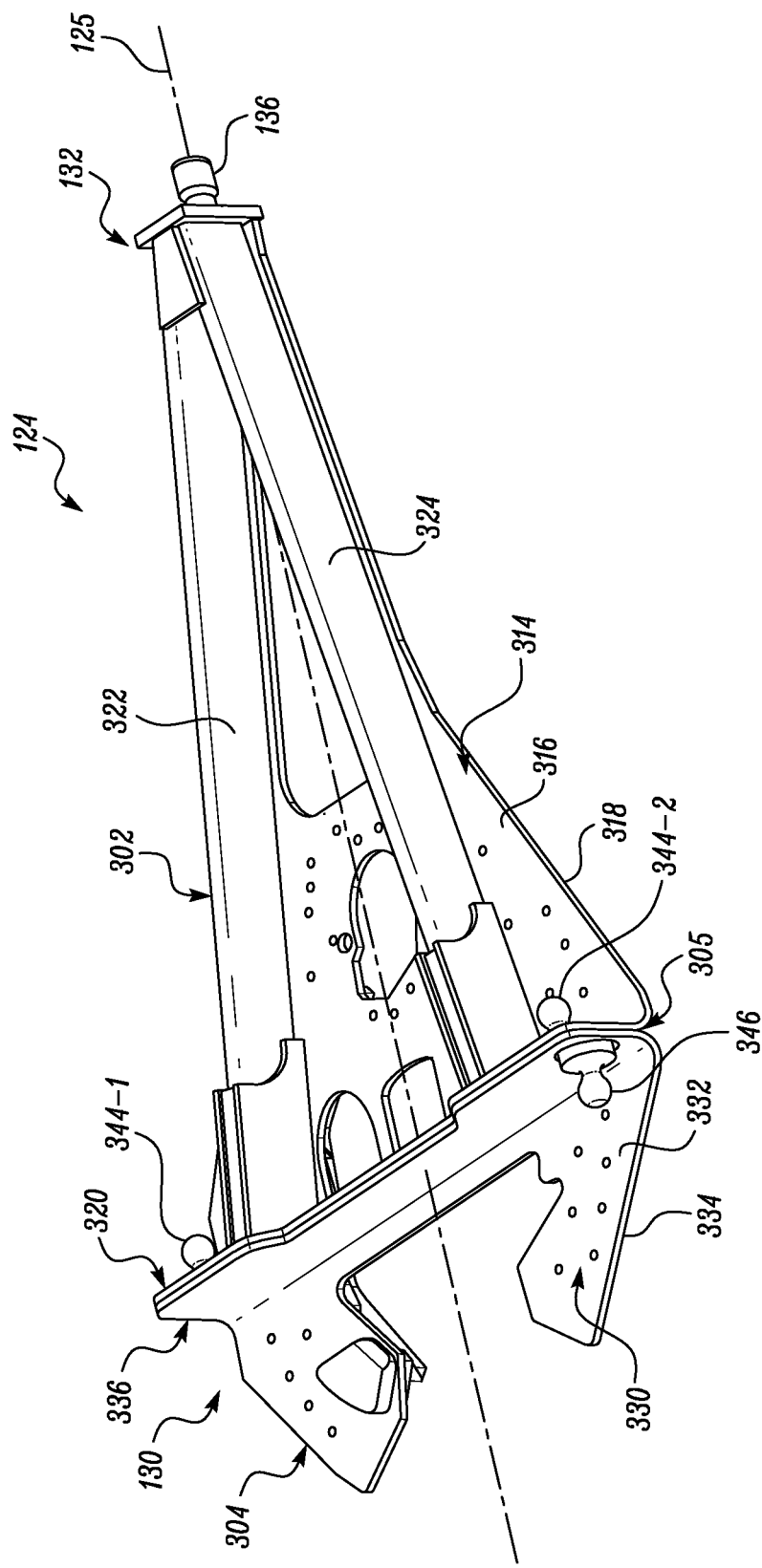
FIG. 4 illustrates the exemplary drawbar assembly having joined first frame member and second frame member at a connection joint, according to the embodiments of the present disclosure.
Figure 5:
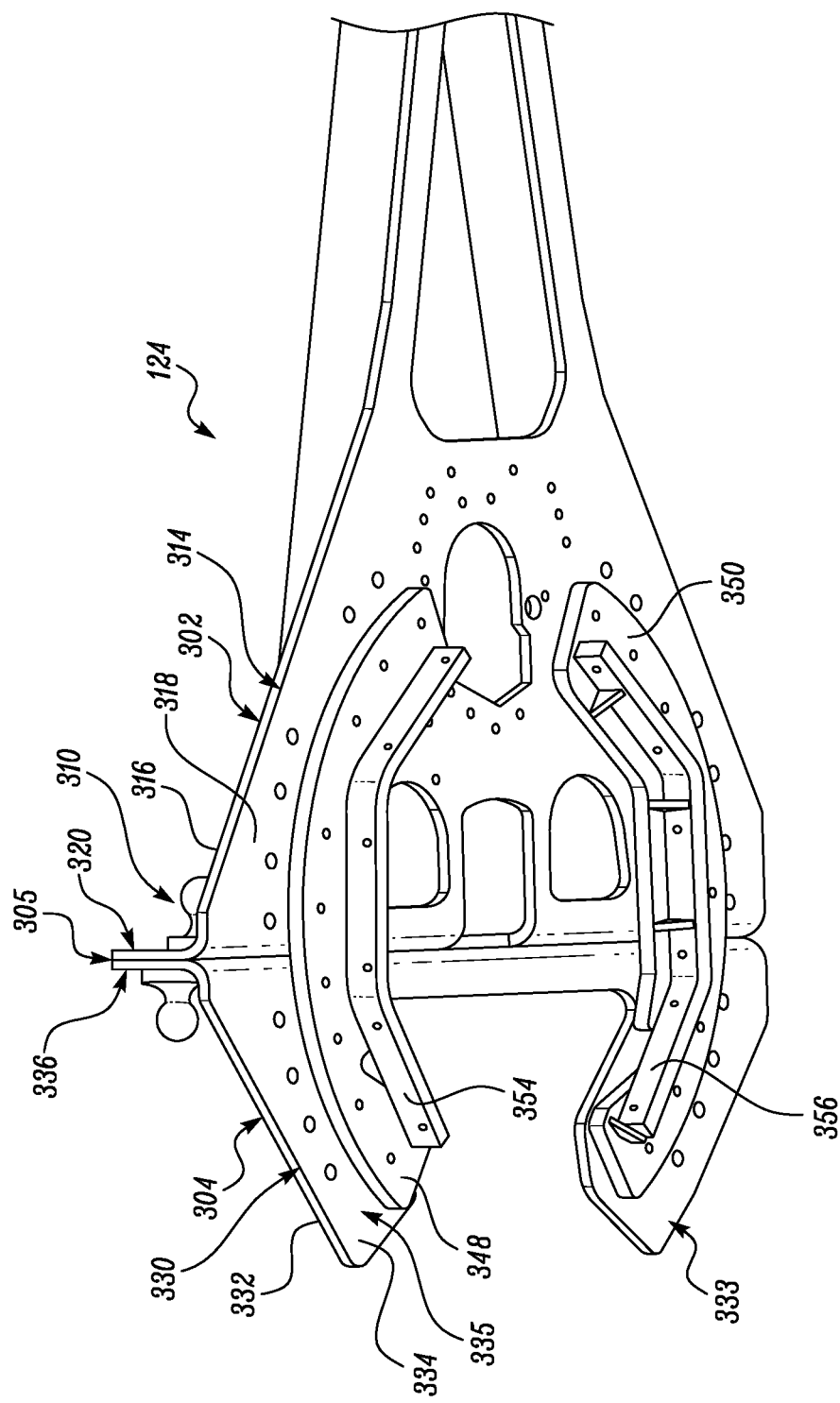
FIG. 5 illustrates a bottom view of the drawbar assembly, according to the embodiments of the present disclosure.

FIGS. 3 to 5 illustrate the exemplary drawbar assembly 124, in accordance with the embodiments of the present disclosure. In an embodiment of the present disclosure, the drawbar assembly 124 includes two frame members, such as a first frame member 302 and a second frame member 304, that are joined together at a connection joint 305 (shown in FIG. 4) to form the drawbar assembly 124. As illustrated in FIG. 3, the first frame member 302 may extend along a first longitudinal axis 306, while the second frame member 304 may extend along a second longitudinal axis 308, such that each of the first and the second longitudinal axis 306, 308 are parallel to each other and align to define the longitudinal axis 125 of the drawbar assembly 124 when the two frame members are joined together.

The first frame member 302 defines a first longitudinal end 310 and a second longitudinal end 312 along the first longitudinal axis 306. The second longitudinal end 312 is configured to be movably coupled to the main frame 116 via the spherical joint 136. The first frame member 302 further includes a first base member 314 extending along the first longitudinal axis 306 between the first longitudinal end 310 and the second longitudinal end 312. In an exemplary embodiment, the first base member 314 is a Y-shaped structure that is wider towards the first longitudinal end 310 and converges towards the second longitudinal end 312 and defines a top surface 316 and a bottom surface 318. It may be contemplated that the shape of the first base member 314 is merely exemplary and may be varied to achieve similar result without deviating from the scope of the present disclosure.

In an embodiment of the present disclosure, the first frame member 302 includes a first mating portion 320 bent away relative to the first base member 314 to extend transversely relative to the first longitudinal axis 306 of the first frame member 302 and consequently the longitudinal axis 125 of the drawbar assembly 124. For example, the first mating portion 320 is disposed at the first longitudinal end 310 of the first frame member 302 and is bent perpendicularly away from the top surface 316 of the first base member 314. In one example, the first mating portion 320 is a rectangular plate shaped portion including a first lateral end 317 and a second lateral end 319 defining a width W1. The first mating portion 320 further defines a mating face 321 (hereinafter referred to as the first mating face 321) and an interior face 323 opposite to the first mating face 321, such that the first mating face 321 and the interior face 323 extend along the width W1, i.e., between the first lateral end 317 and the second lateral end 319 of the first mating portion 320. It may be contemplated that the shape of the first mating portion 320 is merely exemplary and may be varied to achieve similar results without deviating from the scope of the claimed subject matter.

The first frame member 302 further includes a pair of bar members 322, 324 extending along the first longitudinal axis 306 and attached to the top surface 316 of the first base member 314. As illustrated, the pair of bar members 322, 324 are configured to be spaced apart and attached to the interior face 323 of the first mating portion 320 at the first longitudinal end 310 and converge at the second longitudinal end 312 of the first frame member 302, thereby forming a V-shaped configuration of the pair of bar members 322, 324. For example, the first bar member 322 is attached to the interior face 323 proximal to the first lateral end 317 whereas the second bar member 324 is attached to the interior face 323 proximal to the second lateral end 319 of the first mating portion 320. Further, the bar members 322, 324 are configured to converge and attach to a cover member 325 at the second longitudinal end 312 of the first frame member 302. In the exemplary embodiment, the spherical joint 136 is attached to the cover member 325 at the second longitudinal end 308 of the first frame member 302, which in turn is configured to couple to the main frame 116 of the machine 100 to facilitate the articulated movement of the drawbar assembly 124 with respect to the machine 100.

Further, the second frame member 304 defines two longitudinal ends, namely a third end 326 and a fourth end 328, along the second longitudinal axis 308. As illustrated, the second frame member 304 includes a second base member 330 that extends along the second longitudinal axis 308 and consequently along the longitudinal axis 125 of the drawbar assembly 124. The second base member 330 extends between the third end 326 and the fourth end 328 and defines a top surface 332 and a bottom surface 334. In an exemplary embodiment of the present disclosure, the second base member 330 defines a U-shaped structure including a first arm member 333, a second arm member 335 and a second mating portion 336 extending between the first arm member 333 and the second arm member 335.

In an embodiment of the present disclosure, the second mating portion is bent away relative to the second base member 330 to extend transversely with respect to the second longitudinal axis 308 and consequently the longitudinal axis 125 of the drawbar assembly 124. For example, the second mating portion 336 is bent perpendicularly away from the top surface 332 of the second base member 330 at the third end 326. In some examples, the second mating portion 336 is similar or identical to the first mating portion 320, while in some other examples, it may be different. As illustrated, the second mating portion 336 is (like the first mating portion 320) a rectangular plate shaped structure having a first lateral end 337 and a second lateral end 339 defining a width W2 of the second mating portion 336. It may be contemplated that the shape of the second mating portion 336 is merely exemplary and may be varied to achieve similar results without deviating from the scope of the claimed subject matter. In one example, width W2 of the second mating portion 336 is equal to the width W1 of the first mating portion 320 of the first frame member 302. In some alternative embodiments, the widths of the first mating portion 320 and the second mating portion 336 may be varied to be different from each other, to obtain similar results without deviating from the scope of the present disclosure. The second mating portion 336 further defines a second mating face 338 extending along the width W2, i.e., between the first lateral end 337 and the second lateral end 339.

In an embodiment of the present disclosure, the second mating portion 336 is configured to mate with the first mating portion 320 to form the connection joint 305 therebetween. For example, the first mating face 321 of the first mating portion 320 interfaces with the second mating face 338 of the second mating portion 336 to form the connection joint 305 therebetween, where the connection joint 305 extends throughout the entire width W1 and/or W2 of the first mating portion 320 and the second mating portion 336. The first frame member 302 and the second frame member 304 are configured to be joined together at the connection joint 305, to cooperatively support the circle assembly 126 thereunder. In an exemplary embodiment, the first frame member 302 and the second frame member 304 may be joined at the connection joint 305 by a permanent fastening mechanism, such as welding. However, it may be contemplated that a semi-permanent or in some cases, even a non-permanent fastening mechanism may also be used to join the two frame members together to achieve similar results, without deviating from the scope of the claimed subject matter.

Further, each of the first mating portion 320 and the second mating portion 336 include one or more fastening apertures, such as the fastening apertures 340 and 342, respectively. For example, the first mating portion 320 includes two fastening apertures, such as a first fastening aperture 340-1 and a second fastening aperture 340-2, whereas the second mating portion 336 includes one fastening aperture, i.e., a third fastening aperture 342. As shown in FIGS. 3 and 4, the first fastening aperture 340-1 is formed on the first lateral end 317 and the second fastening aperture 340-2 is formed on the second lateral end 319 of the first mating portion 320. The third fastening aperture 342 is formed only on the second lateral end 339 of the second mating portion 336. The fastening apertures 340-1, 340-2 on the first mating portion 320 are configured to engage a respective mounting stud, such as a first mounting stud 344-1 and a second mounting stud 344-2 thereto, which in turn mounts the lifting mechanism, i.e., the hydraulic actuators 134 thereto (as shown in FIG. 2). The third fastening aperture 342 on the second mating portion 336 is configured to engage a third mounting stud 346 thereto, which in turn mounts the swing actuator 137 thereto (shown in FIG. 2). When the first frame member 302 and the second frame member 304 are joined together, the fastening apertures 340-2 on the first mating portion 320 aligns with the fastening aperture 342 on the second mating portion 336. It may be contemplated that the number of fastening apertures and their positioning on each of the mating portion is merely exemplary and may be varied to achieve similar results.

The drawbar assembly 124 further includes a pair of support plates, such as a first support plate 348 and a second support plate 350, each of which is coupled to the bottom surface 318, 334 of each of the first base member 314 and the second base member 330 of the conjoined first frame member 302 and the second frame member 304. For example, each of the first support plate 348 and the second support plate 350 is a curved plate member. As shown in FIG. 5, when the first frame member 302 and the second frame member 304 are joined, the first support plate 348 is attached to the bottom surface 334 of the second base member 330 at the second arm 335 and to a portion of the bottom surface 318 of the first base member 314 towards the first longitudinal end 310. Similarly, the second support plate 350 is attached to the bottom surface 334 of the second base member 330 at the first arm member 333 and to a portion of the bottom surface 318 of the first base member 314 towards the first longitudinal end 310. In some embodiments, the support plates 348, 350 may be fastened to the bottom surfaces 318, 334 using non-permanent fasteners, such as bolts, whereas in some alternative embodiments, they may be fastened using other type of non-permanent, semi-permanent or permanent fastening mechanisms. The pair of support plates 348, 350 are configured to provide additional strength to the joined first frame member 302 and the second frame member 304 and facilitate mounting of the circle assembly 126 to the drawbar assembly 124.

In an embodiment, the drawbar assembly 124 further includes a mounting member 352, including a first mounting rail 354 and a second mounting rail 356, configured to support the circle assembly 126 thereto. As illustrated, the first mounting rail 354 is mounted on to the first support plate 348, whereas the second mounting rail 356 is mounted to the second support plate 350. For example, the first mounting rail 354 and the second mounting rail 356 may be arranged in circular array to engage with corresponding circle shoe assemblies (not shown) disposed on the circle assembly 126 to couple the circle assembly 126 to the drawbar assembly 124.

INDUSTRIAL APPLICABILITY

Figure 6:
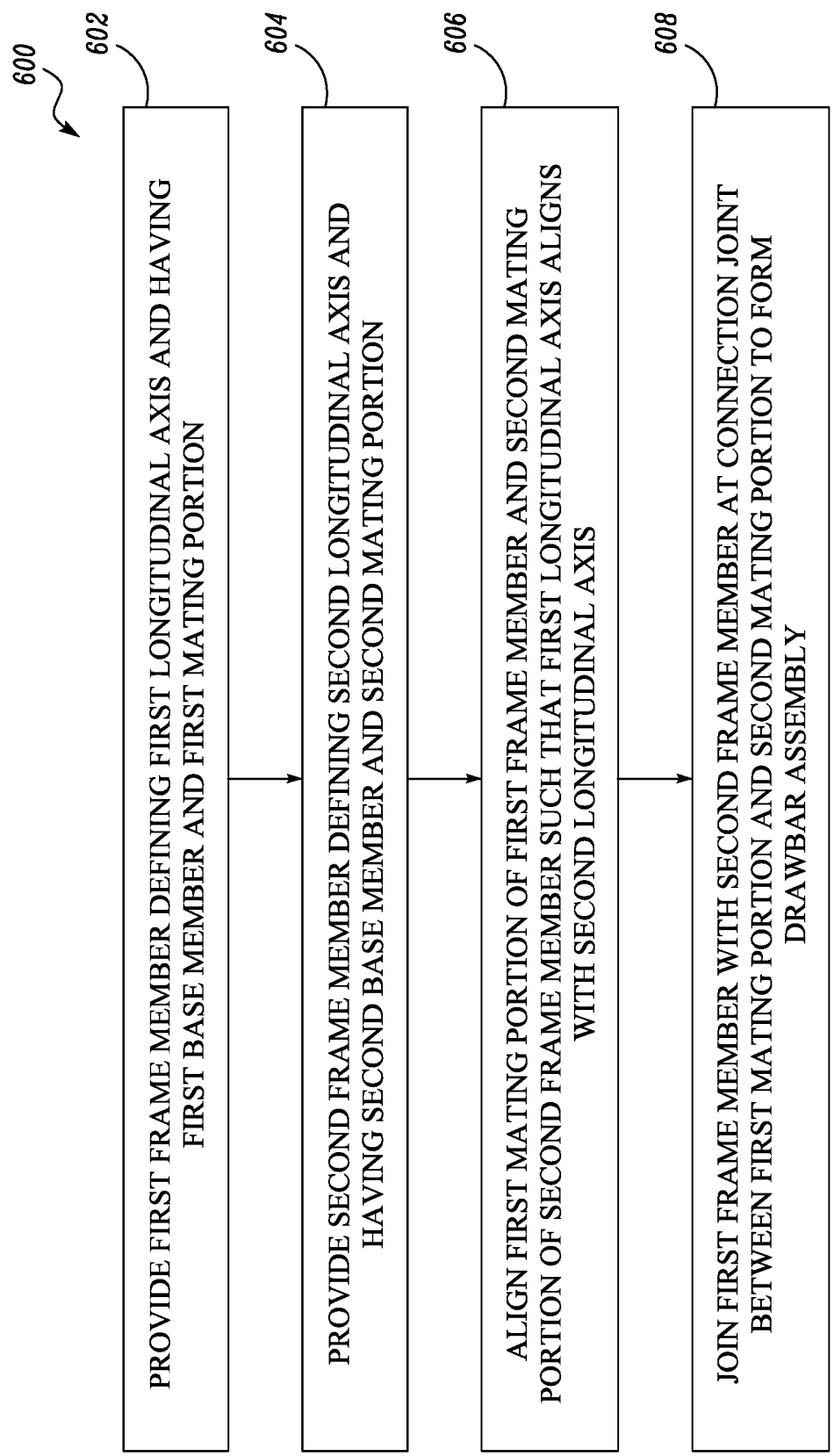
FIG. 6 illustrates an exemplary method of manufacturing the drawbar assembly, according to the embodiments of the present disclosure.

Referring to FIG. 6, an exemplary method 600 of manufacturing a drawbar assembly 124, according to the embodiments of the present disclosure, is described. The method 600 will additionally be described in conjunction to the drawbar assembly 124 illustrated in FIGS. 3 to 5. Initially, at step 602, a first frame member, such as the first frame member 302, is provided. As explained previously, the first frame member 302 defines its longitudinal axis, referred to as the first longitudinal axis 306, and includes a first longitudinal end 310 and a second longitudinal end 312. The first frame member 302 includes a Y-shaped first base member 314 extending along the first longitudinal axis 306 and defining a top surface 316 and a bottom surface 318. In an embodiment of the present disclosure, the first frame member 302 includes a first mating portion 320 disposed at the first longitudinal end 310. The first mating portion 320 is bent perpendicularly away to protrude from the top surface 316 and extend transversely to the first longitudinal axis 306. Additionally, the first frame member 302 includes a pair of bar members 322, 324 arranged in V-configuration to be spaced apart and connected to the first mating portion 320 at the first longitudinal end 310 and converge at the second longitudinal end 312.

At step 604, a second frame member, such as the second frame member 304, is provided. The second frame member 304 defines its longitudinal axis, referred to as the second longitudinal axis 308 and includes a third end 326 and a fourth end 328. The second frame member 304 includes a C-shaped second base member 330 including two arm members 333 and 335 and defining a top surface 332 and a bottom surface 334. In an embodiment of the present disclosure, the second frame member 304 includes a second mating portion 336 disposed at the third end 326. The second mating portion 336 is bent perpendicularly away to protrude from the top surface 332 and extend transversely to the second longitudinal axis 308.

At step 606, the first mating portion 320 is aligned with the second mating portion 336 such that the first longitudinal axis 306 of the first frame member 302 aligns with the second longitudinal axis 308 of the second frame member 304. Once the first mating portion 320 and the second mating portion 336 are aligned, they are joined together to form the connection joint 305 therebetween, at step 608, thereby joining the first frame member 302 and the second frame member 304 to together support the circle assembly 126 thereunder. In an exemplary embodiment, the first mating portion 320 is joined to the second mating portion 336 by welding.

The conjoined first frame member 302 and the second frame member 304 obtains the resultant drawbar assembly 124 of the present disclosure. Thus, the aligned first longitudinal axis 306 and the second longitudinal axis 308 define the longitudinal axis 125 of the drawbar assembly 124. Accordingly, in the resultant drawbar assembly 124, the first mating portion 320 and the second mating portion 336 extend transversely to the longitudinal axis 125 of the drawbar assembly 124. Further, the second longitudinal end 312 of the first frame member 302 becomes the second end 132 of the drawbar assembly 124, which is in turn connected to the main frame 116 of the machine 100 via an articulation joint 136.

Further, once the first frame member 302 and the second frame member 304 are joined, the one or more support plates, such as the first support plate 348 and the second support plate 350 are attached to the bottom surfaces 318 and 334 of each of the first base member 314 and the second base member 330, respectively. As shown in FIG. 5, the support plates 348, 350 are attached to the entire bottom surface 334 at the arm members 333, 335 of the second frame member 304 and to a portion of the bottom surface 318 towards the first longitudinal end 310 of the first frame member 302. In some embodiments, the support plates 348, 350 may be fastened to the bottom surfaces 318, 334 using non-permanent fasteners, such as bolts, whereas in some alternative embodiments, they may be fastened using other type of non-permanent, semi-permanent or permanent fastening mechanisms.

Further, the mounting member 352, including the mounting rails 354, 356, is attached to the support plates 348, 350. The mounting rails 354, 356 are arranged in circular array and configured to engage with corresponding circle shoe assemblies (not shown) disposed on the circle assembly 126, to couple the circle assembly 126 to the drawbar assembly 124.

The drawbar assembly 124 according to the embodiments presented herein, is a two-piece drawbar assembly that is formed by joining two frame members (i.e., the first frame member 302 and the second frame member 304) at the connection joint 305 formed between the respective mating portions 320 and 336 on each of the first frame member 302 and the second frame member 304. Such two-piece drawbar assembly 124 provides flexibility and cost reduction in manufacturing the drawbar assembly 124 for different models of motor graders. For example, the second frame member 304 may be kept common for two models of motor graders, while the first frame member 302 may be different. Generally, the first frame member 302 may differ in its length for different models. Similarly, positioning of the fastening apertures 340-1, 340-2 and consequently the positioning of the lifting actuators 134 may differ based on the change in length of the first frame member 302 for different models of motor graders. Thus, by keeping the second frame member 304 common, only the first frame member 302 needs to be manufactured individually for different models of the motor grader 100, instead of manufacturing the entire drawbar assembly 124 for every model.

Further, the entire width of the first mating portion 320 and the second mating portion 336 are joined together by welding, which provides a strong stress protection against heavy stresses to which the drawbar assembly 124 is subjected to during grading operations of the motor grader 100. Further, conventional drawbar assemblies included a crossbar for mounting the lifting and swinging actuators thereto. The mounting of these actuators to the crossbar was typically strengthened by welding gussets near the actuator mounting locations on the crossbar, to prevent damage to the crossbar and the drawbar assembly under high stress operating conditions. However, the connection joint 305, according to the embodiments of the present disclosure, eliminates the complex welding joints, such as that of gussets to the crossbars on the drawbar assembly, as the conjoined mating portions 320, 336 fulfill the requirement of the traditional crossbar.

It will be apparent to those skilled in the art that various modifications and variations can be made to the system of the present disclosure without departing from the scope of the disclosure. Other embodiments will be apparent to those skilled in the art from consideration of the specification and practice of the system disclosed herein. It is intended that the specification and examples be considered as exemplary only, with a true scope of the disclosure being indicated by the following claims and their equivalent.

What is claimed is:

1. A drawbar assembly for a motor grader, the drawbar assembly defining a longitudinal axis, the drawbar assembly comprising:
   a first frame member defining a first longitudinal end and a second longitudinal end along the longitudinal axis, the first frame member including:
      a first base member extending along the longitudinal axis between the first longitudinal end and the second longitudinal end, and
      a first mating portion at the first longitudinal end and bent away relative to the first base member to extend transversely relative to the longitudinal axis,
         wherein the first frame member is adapted to be movably coupled at the second longitudinal end to a main frame of the motor grader; and
   a second frame member defining a third longitudinal end and a fourth longitudinal end along the longitudinal axis, the second frame member including:
      a second base member extending along the longitudinal axis between the third longitudinal end and the fourth longitudinal end, and
      a second mating portion at the third longitudinal end and bent away relative to the second base member to extend transversely relative to the longitudinal axis,
         wherein the second mating portion is configured to mate with the first mating portion to form a connection joint therebetween, facilitating the first frame member and the second frame member to be conjoined to each other to together support a circle assembly of the motor grader thereunder.

2. The drawbar assembly of claim 1, wherein the first mating portion is bent to protrude perpendicularly away from a top surface of the first base member, and
   wherein the second mating portion is bent to protrude perpendicularly away from a top surface of the second base member.

3. The drawbar assembly of claim 1, further including comprising:
   a mounting member coupled to a bottom surface of the first base member and a bottom surface of the second base member,
   wherein the mounting member is configured to mount the circle assembly thereto.

4. The drawbar assembly of claim 1, wherein the first frame member and the second frame member are configured to be joined at the connection joint by welding.

5. The drawbar assembly of claim 1, wherein the first base member includes a Y-shaped structure, and
   wherein the first frame member is adapted to be movably coupled at the second longitudinal end to the main frame of the motor grader at the second longitudinal end via an articulation joint.

6. The drawbar assembly of claim 1, wherein the first frame member includes a pair of bar members attached to a top surface of the first base member, and
   wherein the pair of bar members are spaced apart and connected to the first mating portion at the first longitudinal end and intersect at the second longitudinal end.

7. The drawbar assembly of claim 1, wherein the first mating portion includes at least one fastening aperture that is configured to engage a lifting mechanism, and
   wherein the second mating portion includes at least one fastening aperture that is configured to engage a swinging mechanism.

8. A method of manufacturing a drawbar assembly for a motor grader, the method comprising:
   providing a first frame member that defines a first longitudinal end and a second longitudinal end along a first longitudinal axis, the first frame member including:
      a first base member extending along the first longitudinal axis between the first longitudinal end and the second longitudinal end, and
      a first mating portion at the first longitudinal end and bent away relative to the first base member to extend transversely relative to the first longitudinal axis;
   providing a second frame member that defines a third longitudinal end and a fourth longitudinal end along a second longitudinal axis, the second frame member including:
      a second base member extending along the second longitudinal axis between the third longitudinal end and the fourth longitudinal end, and
      a second mating portion at the third longitudinal end and bent away relative to the second base member to extend transversely relative to the second longitudinal axis;
   aligning the first mating portion of the first frame member and the second mating portion of the second frame member such that the first longitudinal axis aligns with the second longitudinal axis to define a longitudinal axis of the drawbar assembly; and
   joining the first mating portion to the second mating portion to form a connection joint therebetween, facilitating the first frame member and the second frame member to together support a circle assembly of the motor grader thereunder.

9. The method of claim 8, wherein the first mating portion is bent to protrude perpendicularly away from a top surface of the first base member, and
wherein the second mating portion is bent to protrude perpendicularly away from a top surface of the second base member.

10. The method of claim 8, further comprising,
attaching a mounting member to a bottom surface of the first base member and a bottom surface of the second base member,
wherein the mounting member is configured to mount the circle assembly thereto.

11. The method of claim 8, wherein joining the first frame member and the second frame member includes welding the first frame member and the second frame member at the connection joint.

12. The method of claim 8, wherein the first base member includes a Y-shaped structure, and
wherein the first frame member is configured to be connected at the second longitudinal end to a main frame of the motor grader via an articulation joint.

13. The method of claim 8, wherein the first frame member includes a pair of bar members attached to a top surface of the first base member, and
wherein the pair of bar members are spaced apart and connected to the first mating portion at the first longitudinal end and intersect at the second longitudinal end.

14. The method of claim 8, wherein the first mating portion includes at least one fastening aperture that is configured to engage a lifting mechanism, and
wherein the second mating portion includes at least one fastening aperture that is configured to engage a swinging mechanism.

15. A motor grader comprising:
a main frame;
a circle assembly supporting an implement of the motor grader; and
a drawbar assembly being supported and disposed underneath the main frame, the drawbar assembly defining a longitudinal axis and including:
a first frame member defining a first longitudinal end and a second longitudinal end along the longitudinal axis, the first frame member including:
a first base member extending along the longitudinal axis between the first longitudinal end and the second longitudinal end, and
a first mating portion at the first longitudinal end and bent away relative to the first base member to extend transversely relative to the longitudinal axis; and
a second frame member defining a third longitudinal end and a fourth longitudinal end along the longitudinal axis, the second frame member including:
a second base member extending along the longitudinal axis between the third longitudinal end and the fourth longitudinal end, and
a second mating portion at the third longitudinal end and bent away relative to the second base member to extend transversely relative to the longitudinal axis, wherein the second mating portion is joined to the first mating portion to form a connection joint therebetween; and
a mounting member coupled to the circle assembly and being attached underneath the first frame member and the second frame member.

16. The motor grader of claim 15, wherein the first frame member and the second frame member are joined at the connection joint by welding.

17. The motor grader of claim 15, wherein the first mating portion is bent to protrude perpendicularly away from a top surface of the first base member, and
wherein the second mating portion is bent to protrude perpendicularly away from a top surface of the second base member.

18. The motor grader of claim 15, wherein the first base member includes a Y-shaped structure, and
wherein the second longitudinal end is connected to the main frame of the motor grader via an articulation joint.

19. The motor grader of claim 15, wherein the first frame member includes a pair of bar members attached to a top surface of the first base member, and
wherein the pair of bar members are spaced apart and connected to the first mating portion at the first longitudinal end and intersect at the second longitudinal end.

20. The motor grader of claim 15, wherein the first mating portion includes at least one fastening aperture,
wherein the second mating portion includes at least one fastening aperture, and
wherein the motor grader includes:
an implement lifting mechanism connected to the drawbar assembly at the at least one fastening aperture on the first mating portion to facilitate upward and downward movement of the implement of the motor grader; and
a swinging mechanism connected to the drawbar assembly at the at least one fastening aperture on the second mating portion to facilitate swinging of the drawbar assembly relative to the motor grader.

* * * * *